United States Patent [19]
Yamagishi et al.

[11] Patent Number: 5,552,906
[45] Date of Patent: Sep. 3, 1996

[54] OPTICALLY ADDRESSED PICTURE DISPLAY APPARATUS

[75] Inventors: Shigekazu Yamagishi, Takatsuki; Yoshito Miyatake, Neyagawa; Hiroshi Miyai, Takarazuka, all of Japan

[73] Assignee: Matsushita Electric Industrial Co., Ltd., Kadoma, Japan

[21] Appl. No.: 341,360

[22] Filed: Nov. 17, 1994

[30] Foreign Application Priority Data

Dec. 22, 1993 [JP] Japan .................................... 5-324928

[51] Int. Cl.⁶ ............................ G02F 1/1335; G02F 1/135
[52] U.S. Cl. .................... 359/40; 359/42; 359/72
[58] Field of Search ...................... 359/40, 41, 42, 359/652, 654, 72

[56] References Cited

U.S. PATENT DOCUMENTS

| | | | |
|---|---|---|---|
| 4,852,982 | 8/1989 | Yamamoto et al. | 350/413 |
| 4,945,348 | 7/1990 | Ibamoto et al. | 340/784 |
| 5,132,839 | 7/1992 | Travis | 359/462 |
| 5,315,418 | 5/1994 | Sprague et al. | 359/41 |
| 5,323,472 | 6/1994 | Falk | 382/31 |
| 5,394,254 | 2/1995 | Cheng | 359/42 |
| 5,406,400 | 4/1995 | Matsuda | 359/72 |
| 5,432,567 | 7/1995 | Matsuda | 359/72 |

FOREIGN PATENT DOCUMENTS

| | | |
|---|---|---|
| 436738 | 7/1991 | European Pat. Off. . |
| 5188340 | 7/1993 | Japan . |

*Primary Examiner*—William L. Sikes
*Assistant Examiner*—Charles Miller
*Attorney, Agent, or Firm*—Ratner & Prestia

[57] ABSTRACT

A picture display apparatus which converts an input optical image into a projected picture using a photoelectric effect. The picture display apparatus includes an image transfer device having a plurality of graded index lenses which are bundled in parallel to an optical axis. The image transfer device is provided between an electro-optical device and a picture display device so that an input optical image on the picture display device is transferred in equisize onto the photoconductive layer of the electro-optical device.

13 Claims, 4 Drawing Sheets

OPTICALLY ADDRESSED PICTURE DISPLAY APPARATUS

BACKGROUND OF THE INVENTION

1. Field of the Invention

The present invention relates to a picture display apparatus which converts an input light image into a projected picture using a photoelectric effect.

2. Description of the Prior Art

In the conventional picture display apparatus using an electro-optical device, an image displayed on a picture display device is transferred onto a photoconductive layer of an electro-optical device using a typical transfer lens. Although the transferred image quality is not greatly deteriorated using the transfer lens, the transfer lens is big requiring a long transfer distance. This causes the picture display apparatus to be large.

One method to solve the above problem is to directly couple the picture display device and the photoconductive layer using an optical fiber plate composed of bundled optical fibers where the optical fibers have a diameter of several micrometers and different refractive index values which vary from the center to the periphery of the bundle. The transfer lens is eliminated. By using the optical fiber plate, the transfer distance required can be reduced to several centimeters resulting in a smaller picture display apparatus.

Two typical examples of a picture display apparatus using an electro-optical device in accordance with the prior art are explained below. The first transfers an image through a transfer lens 24 and is shown in FIG. 1. The second transfers an image through an optical fiber plate 25. The first apparatus, shown in FIG. 1, has good resolution but requires a long transfer distance between the picture display device 16 and the electro-optical device 8 and a large transfer lens 24 for obtaining good brightness. As a result, the first apparatus is big and expensive. The second apparatus, shown in FIG. 2, can transfer an image in a short distance using an optical fiber plate 25. The aperture of the optical fiber plate 25 can be made large. The resulting picture is bright, however, the picture resolution is remarkably deteriorated unless the image surface of the transparent liquid crystal panel 17 is tightly held in contact with the surface of the optical fiber plate 25. Accordingly, it is necessary to change the glass base 8g of the electro-optical device 8 to an optical fiber plate and form an electro-optical device on the optical fiber plate 25. As a result, because of bad production yield of both optical fiber plates and electro-optical devices, the apparatus is expensive. In addition, when connecting the optical fiber plate of the electro-optical device 8 and the optical fiber plate of the picture display device 16, some moiré occurs between adjacent fibers of the bundled optical fiber plate resulting in picture quality deterioration.

An optical fiber plate has three problems. The first problem is deterioration in the transferred image. The aperture rate of the optical fiber plate can be made large but the image surface must be held in tight contact with the optical fiber plate surface to prevent defocussing as a result of a gap between the image surface and the optical fiber plate surface. If a gap is present, the spaces between adjacent fibers of the bundled optical fiber plate appear as a net on the picture which deteriorates the picture quality. In addition, the possibility of generating moiré between the net pattern and the displayed picture increases. Moreover, if there is a slant between the fibers and there are a lot of optical fibers bundled together, brightness non-uniformity occurs causing the picture quality to deteriorate remarkably.

The second problem is producing the apparatus and the reliability of the apparatus. As mentioned above, because it is undesirable to place the optical fiber plate apart from the picture plane of the picture display device, the picture plane of the picture display device must be provided directly against the optical fiber plate plane. In addition, the photoconductive layer of the electro-optical device must be attached directly on the optical fiber plate plane. Presently, because the production yield of electro-optical devices is not good, direct coupling between the electro-optical device and the picture display device increases mechanical stress, further lowering the production yield of this part.

The third problem is producing the optical fiber plate. The production man-hour required to produce the optical fiber plate is large because the structure of the optical fiber plate. In addition, the production yield of the optical fiber plate is bad due to breakage or slanting of the optical fibers. As a result, the optical fiber plate has an extremely high cost.

SUMMARY OF THE INVENTION

The present invention relates to reducing the size of the image transfer optical unit of the picture display apparatus. An input image is converted into a projected picture utilizing a photoelectric effect and an electro-optical device. The electro-optical device includes a liquid crystal layer and a photoconductive layer, and a plurality of graded index lenses bundled in parallel with a light axis. An image transfer device is provided between the electro-optical device and the picture display device so that the input image on the picture display device is transferred in equisize onto the photoconductive layer of the electro-optical device.

The picture display device is composed of a cathode ray tube having a flat display face plate or a combination of a liquid crystal panel, a light source and a light guiding means.

Light absorbing material is filled between each adjacent fiber of the bundled graded index lenses. Liquid is filled between the electro-optical device and the image transfer device and between the image transfer device and the picture display device. The liquid can also convect in the spaces between the electro-optical device and the image transfer device and between the image transfer device and the picture display device.

In addition, liquid for cooling may be filled just between the image transfer device and the picture display device instead of filling liquid between the electro-optical device and the image transfer device. In this case, (a) the mechanical distance between the image transfer device and the picture display device is made adjustable or (b) the mechanical distance between the electro-optical device and the image transfer device is made adjustable, so that the optical distance between the image transfer device and the picture display device does not vary, even when the liquid temperature and the refractive index value of the liquid vary.

In addition, the image transfer optical unit can be formed so that the space between the picture display device and the parallel surface glass plate provided between the electro-optical device and the image transfer device is filled with liquid. The liquid is made convectable in the spaces between the parallel surface glass plate and the image transfer device and between the image transfer device and the picture display device.

According to the present invention, the light path length required for image transfer can be made shorter and the size of the transfer lens can be made smaller than the conventional transfer lens. As a result, a reduction in the size of the entire apparatus can be realized. In addition, because there is no contact between the picture display plane and the image transfer device and between the photoconductive layer of the electro-optical device and the image transfer device, there is no mechanical stress and temperature stress is dramatically reduced. Accordingly, the production and reliability of the apparatus is increased.

The image transfer device of the present invention can be considered as an assembly of small transfer lenses, and as a result, a pattern of the image transfer device does not appear on the transferred picture. Accordingly, a good transferred picture can be obtained.

The diameter of a graded index lens included in an image transfer device according to an exemplary embodiment of the present invention is about 1 millimeter, and the diameter of an optical fiber included in the optical fiber plate is several micrometers. Accordingly, the production and handling of the image transfer device is improved and the problems in producing the image transfer device are reduced.

Thus, according to the exemplary embodiments of the present invention, the image transfer device and the optical path length required for image transfer can be dramatically shortened and the size of the entire apparatus can be reduced. In addition, the problems in producing the apparatus are dramatically reduced and the cost of the apparatus is lowered.

DETAILED DESCRIPTION OF THE INVENTION

First exemplary embodiment

Figure 1:
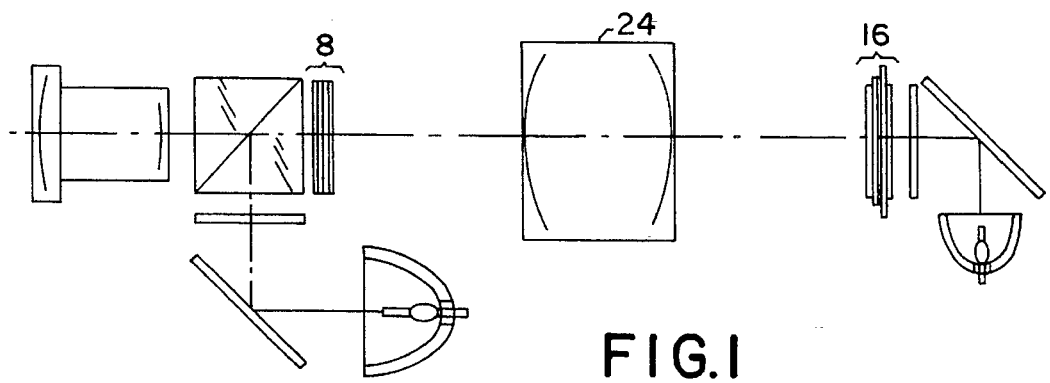
FIG. 1 illustrates a configuration of a picture display apparatus using an electro-optical device which transfers an image through a transfer lens in accordance with the prior art.
Figure 2:
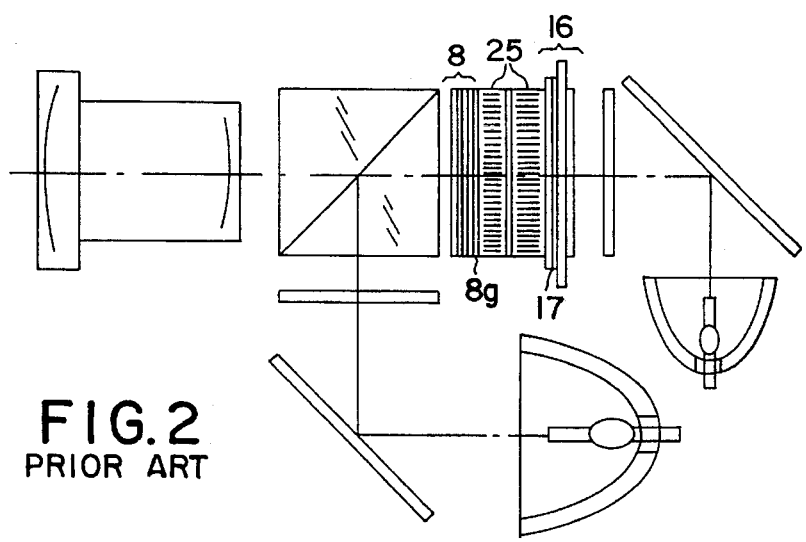
FIG. 2 illustrates a configuration of a picture display apparatus using an electro-optical device which transfers an image through an optical fiber plate in accordance with the prior art.
Figure 3:
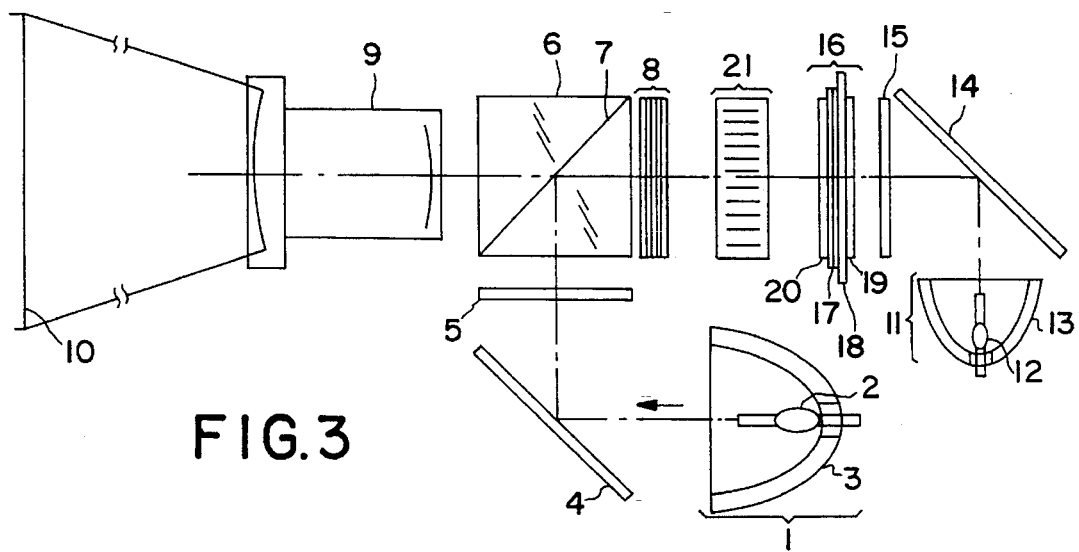
FIG. 3 illustrates a configuration of a picture display apparatus using an electro-optical device in accordance with a first exemplary embodiment of the present invention.

A configuration of a picture display apparatus using an electro-optical device in accordance with a first exemplary embodiment of the present invention is illustrated in FIG. 3.

Figure 4:
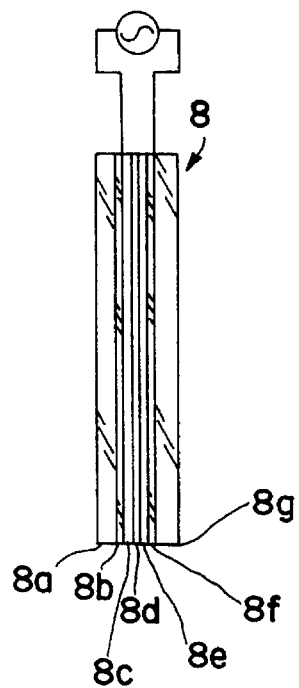
FIG. 4 illustrates a configuration of an electro-optical device used in a picture display apparatus in accordance with the first exemplary embodiment of the present invention.

A configuration of an electro-optical device used in a picture display apparatus in accordance with a first exemplary embodiment of the present invention is illustrated in FIG. 4.

Figure 5:
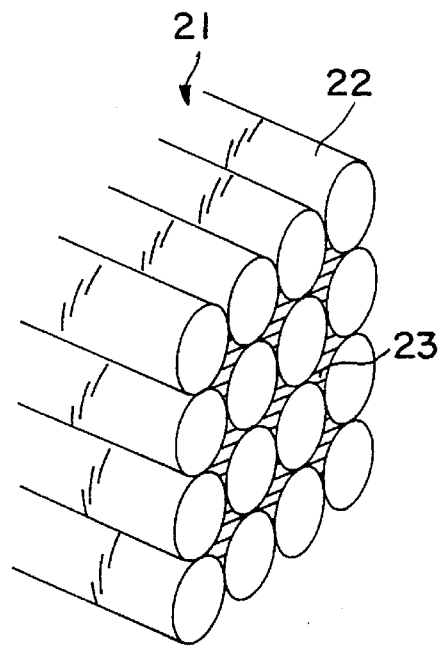
FIG. 5 illustrates a configuration of an image transfer device used in a picture display apparatus in accordance with the first exemplary embodiment of the present invention.

A configuration of an image transfer device used in a picture display apparatus in accordance with a first exemplary embodiment of the present invention is illustrated in FIG. 5.

A first light source unit 1 is composed of a first light source 2 and a first reflector 3 reflecting the light emitted from the first light source 2 towards the aperture direction in parallel to the reflector axis. The infrared component of the light emitted from the first light source 2 is removed by a cold mirror 4 provided at a slant with respect to the light axis of the light reflected from the first light source unit 1. The light being reflected at the cold mirror 4 excluding the infrared component, passes through a first dichroic filter 5 for removing ultraviolet rays. The first dichroic filter 5 is located on the light path of the reflected light from the cold mirror 4. The dichroic filter 5 removes ultraviolet rays from the reflected light. After passing through the first dichroic filter 5, the light is composed of only visible rays which enter a polarized beam splitter 6.

The polarized beam splitter 6 is constructed of (a) a dielectric multilayer film 7 at the boundary surface between two glass components or (b) a parallel surface glass plate with a dielectric multilayer film disposed in liquid. The component of the incoming light and the polarized light which oscillate in a direction parallel to the incoming light plane which is perpendicular line to the dielectric multilayer film 7 (hereafter called P polarized light), passes through the dielectric multilayer film 7. The polarized light which oscillates in a direction perpendicular to the P polarized light (hereafter, called S polarized light) is reflected at the dielectric multilayer film 7. Accordingly, the visible rays entering the polarized beam splitter 6 are split into P polarized light which travels to the outside of the light path and S polarized light which is reflected at the dielectric multilayer film 7 and enters an electro-optical device 8.

The electro-optical device 8 includes glass basements 8a and 8g, transparent electrodes 8b and 8f, a liquid crystal layer 8c, a light shield layer 8d and a photoconductive layer 8e as shown in FIG. 4. When there is no light provided to the photoconductive layer 8e, an applied voltage is applied to the photoconductive layer 8e because the resistance of the photoconductive layer 8e is larger than that of the liquid crystal layer 8c. As a result, the photoelectric effect does not occur in the liquid crystal layer 8c. When light is provided to the photoconductive layer 8e, the resistance of the photoconductive layer 8e decreases and voltage is applied to the liquid crystal layer 8c and a photoelectric effect occurs in the liquid crystal layer 8c.

Accordingly, when the photoconductive layer 8e is not illuminated, the S polarized light split by the polarized beam splitter 6 is reflected by the light shield layer 8d after passing through the glass basement 8a, the transparent electrodes 8b and the liquid crystal layer 8c. After being reflected, the light travels in the reverse direction, that is through the liquid crystal layer 8c, the transparent electrode 8b and the glass basement 8a prior to entering the polarized beam splitter 6. Because no photoelectric effect had occurred in the liquid crystal layer 8c, the polarizing direction of the reflected light does not change and, thus, the light is S polarized light. Accordingly, the light is reflected at the dielectric multilayer 7 as explained above and does not travel to projection lens 9.

When the photoconductive layer 8e is illuminated, the S polarized light from the polarized beam splitter 6 is reflected by the light shield layer 8d after passing through the glass basement 8a, the transparent electrode 8b and the liquid crystal layer 8c. The reflected light advances through the liquid crystal layer 8c, the transparent electrodes 8b and the glass basement 8a and enters the polarized beam splitter 6. However, because a photoelectric effect occurred in the liquid crystal layer 8c, the polarizing direction of the reflected light is changed by 90 degrees and the light becomes P polarized light. As a result, the light passes through the dielectric multilayer 7 as explained above and enters the projection lens 9.

The projection lens 9 is placed at a position to project and enlarge the image from the electro-optical device B. The light passing through the liquid crystal layer 8c corresponding to the illuminated area on the photoconductive layer 8e is projected on screen 10 through projection lens 9 and the corresponding area becomes white on the screen 10.

On the other hand, the light passing through the liquid crystal layer 8c corresponding to an area which is not illuminated on the photoconductive layer 8e does not enter the projection lens 9 and the corresponding area becomes black on the screen 10. Thus, if an image is optically written in the photoconductive layer 8e, the image is projected on the screen through projection lens 9.

Next, an optical system for writing an image in the photoconductive layer 8e is explained. A second light source unit 11, similar to the first light source, includes a second light source 12 and a second reflector 13 for reflecting the light emitted from the second light source 12 towards the aperture direction in parallel to the reflector axis. The light output of the second light source 12 is smaller than that of the first light source 2.

The infrared rays in the light emitted from the second light source 12 are reflected at dichroic mirror 14. The ultraviolet rays which are not removed are removed at a second dichroic filter 15 so that the infrared rays enter the picture display device 16. The picture display device 16 includes a transparent liquid crystal panel 17, a basement 18 which provides a driving circuit (not shown in the drawings) and an aperture larger than the panel aperture at the position corresponding to the aperture of the transparent liquid crystal panel 17, an input side polarizing plate 19 which has a light passing axis in the directions in which the polarizing directions are orthogonal to each other at the input side and output side of transparent liquid crystal panel 17, and an output side polarizing plate 20.

When there is no signal or a white signal is provided, the light passing through the input side polarizing plate 19 passes through the output side polarizing plate 20 having its polarizing direction shifted by 90 degrees by the liquid crystal.

When a black signal is provided, the light passing through the input side polarizing plate 19 does not have its polarizing direction changed. In addition, the light passing through the input side polarizing plate 19 is absorbed by the output side polarizing plate 20 and shielded. A picture can be displayed by partially changing the variation of the polarizing direction according to the signal.

The light which is emitted from the second light source 11 and which passes through an area corresponding to the white display on the picture display device 16 travels to the image transfer device 21. The image transfer device 21 is on the optical axis between the picture display device 16 and the electro-optical device 8. The image transfer device 21 includes a plurality of tubular graded index lenses 22 which are bundled in parallel to the optical axis where the gaps between each adjacent lens are filled with black silicone resin 23 as light absorbing material in order to absorb the harmful light leaked from the lenses. The graded index lens 22 has a decreasing refractive index distribution from the center to the periphery and the length of the lens, in the optical axis direction, so that an equisized image is obtained at the designated wave length of the light.

The transparent liquid crystal panel 17 is placed at a position corresponding to the object plane of the image transfer device 21 so that the photoconductive layer 8e of the electro-optical device 8 is at a position corresponding to the image plane. As a result, the light passes through the white display area of the picture display device 16 to the photoconductive layer 8e. The image displayed on the transparent liquid crystal panel 17 is transferred to photoconductive layer 8e.

Thus, the picture on the transparent liquid crystal panel 17 is projected on the screen 10 by a combination of the electro-optical device 8, the polarized beam splitter 6, and the projection lens 9.

According to the first exemplary embodiment of the present invention, the image transfer device 21 is an assembly of small transfer lenses where the axial length of the image transfer device can be shorter than the transfer lens 24. The aperture of the image transfer device can be easily made large as compared to the transfer lens 24 and a bright transferred image can be obtained.

Because the image transfer device 21 does not tightly contact the electro-optical device 8 or the picture display device 16 like optical fiber plate 25, the apparatus is easier to produce. Assemblies of graded index lenses with one or two line arrays are used in image transfer machines such as copying machines or facsimile machines. These assemblies have no significant production problems. Thus, a picture display apparatus having a bright, high resolution picture which is easier to produce is obtained at a lower price.

Infrared rays are used to write the image in this exemplary embodiment, however, the exemplary embodiment is not restricted to infrared rays but can be designed to match the optimum wave length of other electro-optical devices.

Figure 6:
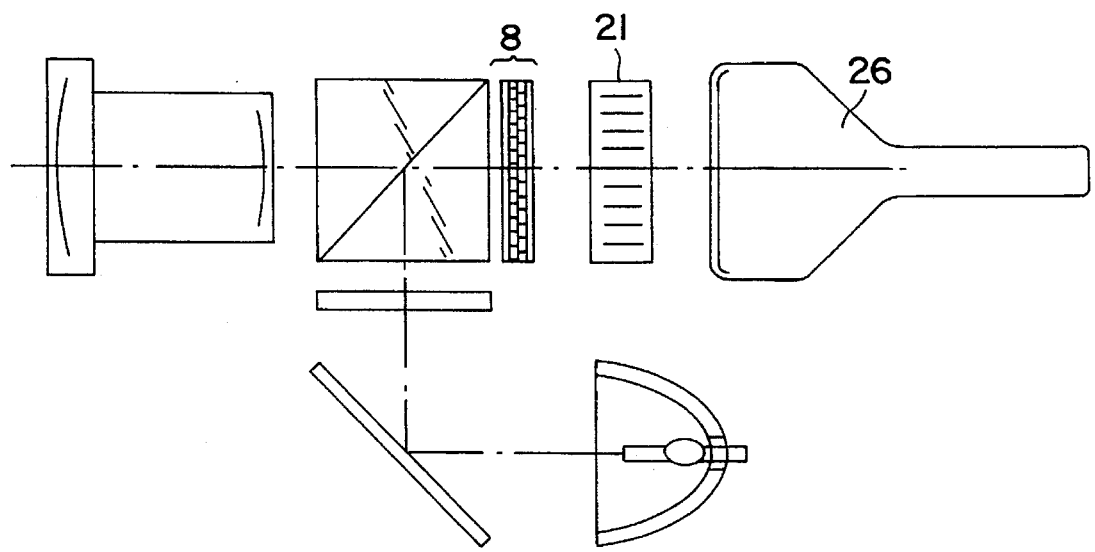
FIG. 6 illustrates a configuration of a picture display apparatus using an electro-optical device which uses a cathode ray tube as a picture display device in accordance with the first exemplary embodiment of the present invention.

As shown in FIG. 6, the second light source unit 11, the dichroic mirror 14, the second dichroic filter 15, and the picture display device 16 in the first exemplary embodiment can be replaced with a cathode ray tube 26. Because the picture display plane must be placed within the focal depth of the image transfer device 21, the cathode ray tube must have a flat face. The phosphor of the cathode ray tube must have a light emitting characteristic matching the characteristic of the electro-optical device 8.

Second exemplary embodiment

Figure 7:
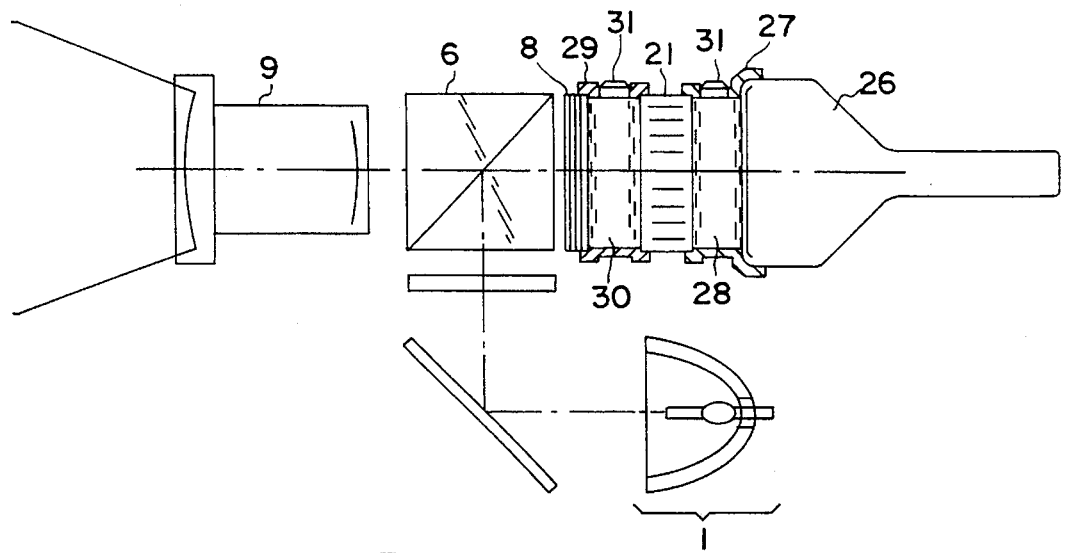
FIG. 7 illustrates a configuration of a picture display apparatus using an electro-optical device in accordance with a second exemplary embodiment of the present invention.

A configuration of a picture display apparatus using an electro-optical device in accordance with a second exemplary embodiment of the present invention is illustrated in FIG. 7.

The second exemplary embodiment has a similar configuration to the first exemplary embodiment in that it includes a reading optical system having a first light source unit 1, a polarized beam splitter 6, an electro-optical device 8, and a projection lens 9. A cathode ray tube 26 with a flat face plate, however, is included instead of a writing optical system. The writing optical system includes a second light source unit 11, a dichroic mirror 14, a second dichroic filter 15, and a picture display device 16. The cathode ray tube 26 is used as a picture display device. The image transfer device 21 and the cathode ray tube are combined with a first casing 27 which has apertures facing towards the picture display face of the cathode ray tube 26. The input side effective area of the image transfer device 21 and the inside of the first casing 27 are filled with a first liquid 28. There is no air between the cathode ray tube 26 and the image transfer device 21.

The image transfer device 21 and the electro-optical device 8 are similarly combined with a second casing 29 which has apertures facing towards the output side effective area of the image transfer device 21 and the effective area of the photoconductive layer 8e of the electro-optical device 8. The inside of second casing 29 is filled with a second liquid 30. There is no air between the image transfer device 21 and the electro-optical device 8. Because the liquid 28 and 30 have a volume variation according to their temperature change, volume expansion (shrinkage) absorbing means 31 is provided in both the first casing 27 and the second casing 29.

According to the second exemplary embodiment, the difference in the light caused by the refractive index of the glass is reduced by replacing the layer with liquid 28 and 30. In addition, the penetration rate due to reflection at the boundary face is decreased, the deterioration in the contrast of the transferred image due to drifting light can be suppressed, and a good picture can be obtained.

When the liquid temperature variation is not large, the above-mentioned configuration has no problem. When the liquid temperature variation is large, however, the refractive index of the liquid varies according to the change in liquid temperature and the optical path length varies. As a result, deterioration of the transferred image quality occurs. The majority of the temperature increase is usually caused by heat dissipation of the cathode ray tube 26. In addition, the temperature of the first liquid 28 between the cathode ray tube 26 and the image transfer device 21 is higher than that of the second liquid 30 between the image transfer device 21 and the electro-optical device 8. When the first liquid 28 is increased in temperature, the volume of the liquid as well as the refractive index of the liquid varies. For example, when ethylene glycol is used for the first liquid 28, and if the refractive indices of an e-ray (546 nanometer) at 23 degrees C. and 40 degrees C. are defined as $n_1$ and $n_2$, respectively, and the length of the optical axial direction of the first liquid 28 is $d_1$, the optical path length substantially varies by $(1/n_1 - 1/n_2) * d1$ when compared with the optical path length at 23 degrees C.

For example, if $n_1=1.4337$ and $n_2=1.4228$, $(1/n_1-1/n_2) * d_1=0.0054*d_1$.

Since the optical path length varies by $0.0054*d_1$, the distance between the object plane and the image transfer device 21 varies and the distance between the image transfer device 21 and the image plane of the electro-optical device 8 also varies. As a result, deterioration of the transferred image formed on the photoconductive layer 8e occurs. In addition, since the image transfer device 21 is composed of a plurality of tubular graded index lenses, if the optical distance d2 between the picture display plane of the picture display device and the input side plane of the image transfer device 21 is different from the optical distance d3 between the output side plane of the image transfer device 21 and the photoconductive layer 8e, the relation d2 : d3=1 : 1, is not maintained. Consequently, the images of the adjacent lenses partly overlap resulting in remarkable deterioration in picture quality. Even if the optical distances d2 and d3 deviate from design values, if the difference between the two optical distances d2 and d3 is small, the affect on picture quality is smaller than the case where either d2 or d3 is near the design value but the other is greatly deviated from the design value.

Figure 8:
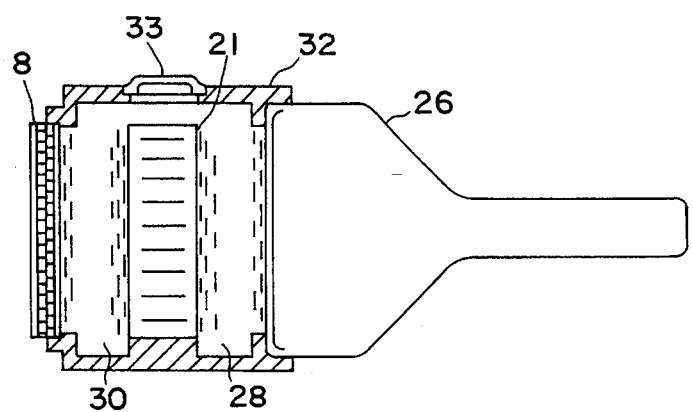
FIG. 8 illustrates a first example of the image transfer optical unit employing temperature compensation used in a picture display apparatus using an electro-optical device in accordance with the second exemplary embodiment of the present invention.

A first example of the image transfer means employing temperature compensation used in a picture display apparatus using an electro-optical device in accordance with a second exemplary embodiment of the present invention is illustrated in FIG. 8.

When there is a large amount of heat dissipation, the temperature distribution is made uniform by designing casing 32 larger than the effective part of the image transfer device 21 so that liquid 28 and 30 can convect as shown in FIG. 8. That is, even if the temperature variation occurs between liquid 28 and 30, the difference between d2 and d3 does not become large and picture quality deterioration of the transferred image is suppressed. In addition, if a means was provided to increase convection of the liquid in the casing 32, temperature variation can be further reduced.

Casing 32 is formed as one piece when the liquid can convect in the casing. In addition, a radiator could be attached to casing 32 to exhaust heat. Moreover, forced air cooling by a fan can decrease the temperature difference between (a) liquid 28 between the picture display plane and the image transfer device 21 and (b) liquid 30 between the image transfer device 21 and the electro-optical device 8. As a result, a good image can be transferred onto the photoconductive layer 8e independent of the temperature of the apparatus.

Figure 9:
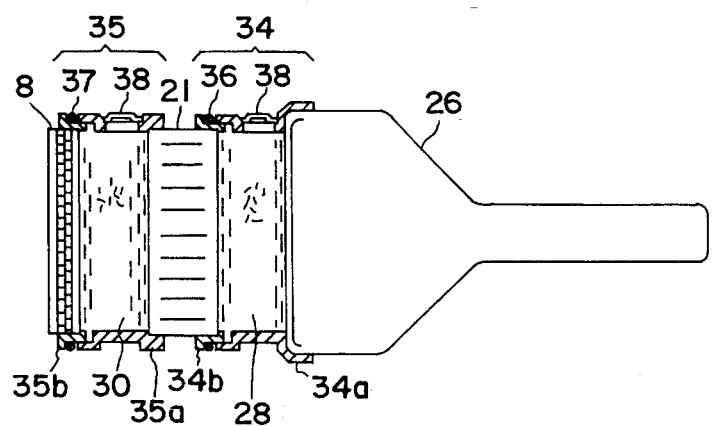
FIG. 9 illustrates a second example of the image transfer optical unit employing temperature compensation used in a picture display apparatus using an electro-optical device in accordance with the second exemplary embodiment of the present invention.

A second example of the image transfer means employing temperature compensation used in a picture display apparatus using an electro-optical device in accordance with the second exemplary embodiment of the present invention is illustrated in FIG. 9.

The cathode ray tube 26 and the image transfer device 21 are combined with a first casing 34 which has apertures facing towards the picture display area of the cathode ray tube and the input side effective area of the image transfer device 21. The first casing 34 is filled with a first liquid 28. There is no air layer between the cathode ray tube 26 and the image transfer device 21.

The image transfer device 21 and the electro-optical device 8 are similarly combined with a second casing 35 which has apertures facing towards the output side effective area of the image transfer device 21 and the effective area of the photoconductive layer 8e of the electro-optical device 8. The second casing 35 is filled with a second liquid 30. There is no air layer between the image transfer device 21 and the electro-optical device 8.

Both the first casing 34 and the second casing 35 are composed of two units. The first casing 34 is composed of a front casing 34a and a rear casing 34b. The gap between the front casing 34a and the rear casing 34b is variable along the optical axis according to the temperature variation. The gap is made variable by using an elastomer 36 filled between the front casing 34a and the rear casing 34b.

The second casing 35 is similarly composed of a front casing 35a, a rear casing 35b and elastomer 37. Because the refractive indices of the first liquid 28 and the second liquid 30 vary according to the temperature, the optical distances between the cathode ray tube 26 and the image transfer device 21 and between the image transfer device 21 and the electro-optical device 8 vary. Elastomer 36 and 37 contract along the optical axis so that the optical distances are substantially equal to the optical distances at room temperature.

If the difference of the refractive indices against liquid temperature variation is defined as $\Delta n$, the elastomer length variation on the optical axis against elastomer temperature variation is defined as $\Delta d$ and the liquid length along the optical axis at room temperature is defined as $d_1$, the following relation is obtained.

$$(1-1/\Delta n)(\Delta d + d_1) = d_1$$

Thus, a good transferred image can be obtained independent of temperature variation.

The elastomer does not necessarily have to be placed at the center of the casings 34 and 35 but may be placed at the edge.

Figure 10:
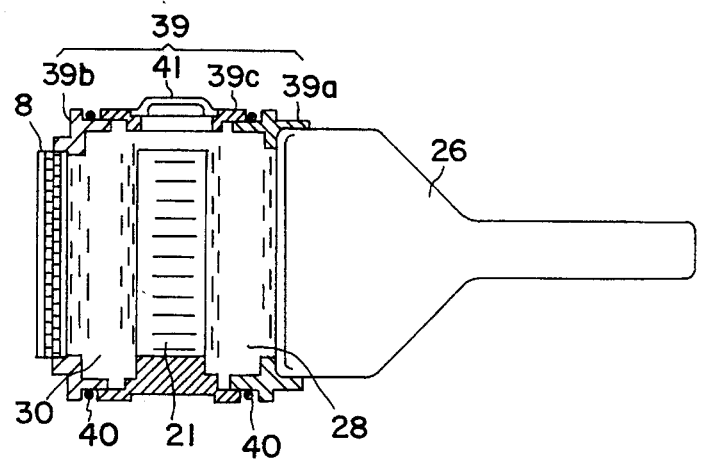
FIG. 10 illustrates a third example of the image transfer optical unit employing temperature compensation used in a picture display apparatus using an electro-optical device in accordance with the second exemplary embodiment of the present invention.
Figure 11:
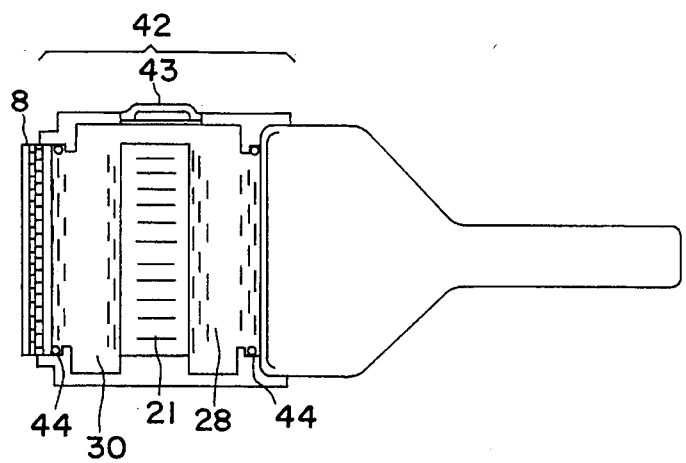
FIG. 11 illustrates a fourth example of the image transfer optical unit employing temperature compensation used in a picture display apparatus using an electro-optical device in accordance with the second exemplary embodiment of the present invention.

FIG. 10 and FIG. 11 illustrate third and fourth examples, respectively, of the image transfer means employing temperature compensation used in a picture display apparatus using an electro-optical device in accordance with the second exemplary embodiment of the present invention. The optical distance between the picture display plane of the cathode ray tube 26 and the input side of the image transfer device 21 is made to be equal to the optical distance between the output side of the image transfer device 21 and the photoconductive layer 8e.

The image transfer means explained in the second, third and fourth examples of the second exemplary embodiment, had the length of the optical axis direction varied with n elastomer, however, other materials which vary in volume according to temperature can be used instead of an elastomer. In addition, the same effect can be obtained by providing a casing which has a variable volume such as would be produced by a bellow mechanism or a moving mechanism which absorbs the variation in the optical length as a result of liquid temperature variation.

Third exemplary embodiment

Figure 12:
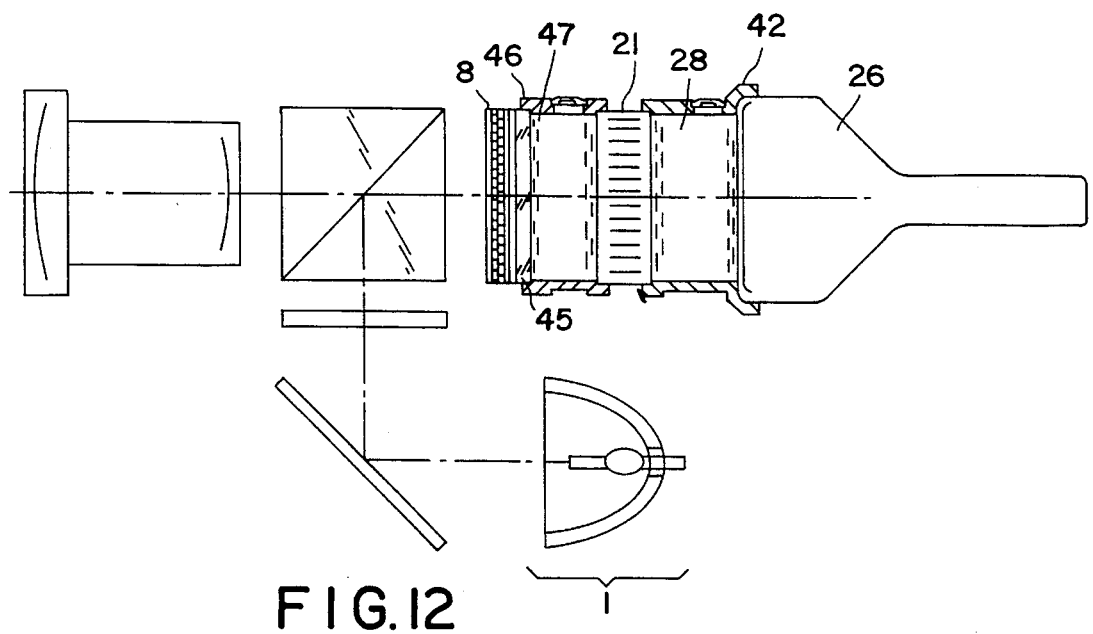
FIG. 12 illustrates a configuration of a picture display apparatus using an electro-optical device in accordance with a third exemplary embodiment of the present invention.

A configuration of a picture display apparatus using an electro-optical device in accordance with a third exemplary embodiment of the present invention is illustrated in FIG. 12.

The third exemplary embodiment has a similar configuration to the first and the second exemplary embodiments including a reading optical system and a cathode ray tube 26 used as a picture display device. The cathode ray tube 26 and the image transfer device 21 are combined with a first casing 27 which has apertures facing towards the picture display face of the cathode ray tube 26 and the input side effective area of the image transfer device 21. The inside of the first casing 27 is filled with first liquid 28. There is no air layer between the cathode ray tube 26 and the image transfer device 21, as in the second exemplary embodiment.

A parallel surface glass plate 45 for passing the writing light is placed on the optical axis, perpendicular to the optical axis and between the image transfer device 21 and the electro-optical device 8. The parallel surface glass plate 45 and the image transfer device 21 are combined with a second casing 46 which has apertures facing towards the effective area of the parallel surface glass plate 45 and the output side effective area of the image transfer device 21. The inside of the second casing 46 is filled with a second liquid 47 and there is no air layer between the image transfer device 21 and the parallel surface glass plate 45. Here, the air gap between the parallel surface glass plate 45 and the glass basement 8f of the electro-optical device 8 is very small as compared to the gap filled with the second liquid 47 between the image transfer device 21 and the parallel surface glass plate 45.

If there is an air layer between the parallel surface glass plate 45 and the electro-optical device 8, some harmful light may be generated at the boundary face between the parallel surface glass plate 45 and the electro-optical device 8. When light with a very high brightness level is provided to the electro-optical device 8 from the first light source unit 1 as reading light, the electro-optical device 8 can not necessarily reflect 100% of the light. As a result, some of the light may be absorbed heating the reading side of the electro-optical device 8. When the temperature of the reading side of the electro-optical device 8 rises significantly, if the liquid is in direct contact with the writing side such as in the second exemplary embodiment, the temperature difference between the reading side and the writing side of the electro-optical device 8 becomes large and stress occurs in the electro-optical device 8. As a result, the projected picture quality may deteriorate. According to the third exemplary embodiment, because the liquid does not directly contact the electro-optical device 8, the stress in the electro-optical device 8, the optical loss, and harmful light at the boundary surface is suppressed. Thus, a good transferred picture can be obtained.

In the third exemplary embodiment, the optical performance can be effected by liquid temperature variation as in the second exemplary embodiment.

A picture display apparatus, according to the exemplary embodiments of the present invention, converts the input optical image into the projected picture by a photoelectric effect. The apparatus includes an electro-optical device having a liquid crystal layer and a photoconductive layer. Also included are a plurality of graded index lenses bundled in parallel to the optical axis and an image transfer device which is placed between the electro-optical device and the picture display device so that the input image given by the picture display device is transferred in equisize onto the photoconductive layer of the electro-optical device. The whole apparatus can be made smaller without any picture quality deterioration by making the image transfer means smaller. At the same time, the apparatus can be made at low cost by improving the ability to produce the optical transfer devices.

A cathode ray tube with a flat display face or a combination of a liquid crystal panel, a light source, and light guiding means are available as a picture display device.

When a cathode ray tube is used, contrast deterioration of the transferred image is prevented by filling liquid in the spaces between the picture display device and the image transfer device and between the image transfer device and the electro-optical device.

In general, when light travels into glass from the air, a percentage of the light is reflected at the boundary plane between the glass and the air. According to the exemplary embodiments of the present invention, the image transfer distance is short, where a cathode ray tube is used, the light emitting angle and the angle of the incoming light is wide. Therefore, the reflection index at the surface of the image transfer device becomes large and the reflected light becomes harmful. As a result, contrast deterioration of the transferred image occurs. Accordingly, if the spaces between the electro-optical device and the image transfer device and between the image transfer device and the picture display device are air, it is necessary to provide reflection preventing films at each light incoming surface and light outgoing surface. Even if reflection preventing films are provided, however, if the incoming light angle is large and is different from the optimum incoming angle of the reflection preventing films, the reflection preventing films are not always effective.

According to the exemplary embodiment of the present invention, a liquid is placed between the electro-optical device and the image transfer device and between the image transfer device and the picture display device eliminating air in these spaces. As a result, when the incoming light angle has a wide angle, the reflection at the glass surface can be remarkably reduced. This occurs because the refractive index of the liquid is chosen near the refractive index of glass.

The refractive index of the liquid, however, can vary when the liquid temperature varies causing the optical path length to vary. As a result, the picture resolution can deteriorate. For example, where an image transfer device includes a plurality of graded index lenses, the transferred image is composed of overlapped transferred images from the graded index lenses. If the transferred image size differs from the equisize image, the image is synthesized with a deviated transfer position from lens to lens causing the picture quality to deteriorate. To suppress the picture quality deterioration, the image transfer device is provided at a central position so that the distance from the photoconductive layer of the electro-optical device is equal to the distance from the picture display surface of the picture display device. The refractive index value of the liquid between the image transfer device and the electro-optical device must be equal to the refractive index value of the liquid between the picture display device and the image transfer device. That is, the temperature of the two liquids should be kept substantially the same. Therefore, the liquid between the image transfer device and the electro-optical device and the liquid between the picture display device and the image transfer device are designed to be convectable.

The image transfer means can also be formed so that the space between the electro-optical device and the image transfer device is filled with liquid and the space between the image transfer device and the picture display device is filled with air. In addition, the mechanical distance between the image transfer device and the picture display device can be adjustable or the mechanical distance between the electro-optical device and the image transfer device can be adjustable. In addition, a good picture can be obtained on the screen independent of a temperature increase because the image transfer means is formed so that the space between the parallel surface glass plate provided between the electro-optical device and the image transfer device and the picture display device is filled with liquid which can convect.

The invention may be embodied in other specific form without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed:

1. A picture display apparatus comprising:

picture display means for displaying a picture;

electro-optical means for converting an input optical image to a projected picture, said electro-optical means having a liquid crystal layer and a photoconductive layer; and an image transfer device disposed between said electro-optical means and said picture display means so that the picture displayed on said picture display means is transferred onto said photoconductive layer of said electro-optical means, said image transfer means having a plurality of graded index lenses parallel to an optical axis intersecting said electro-optical means and said picture display means, wherein a liquid is disposed (a) between said electro-optical means and said image transfer means and (b) between said image transfer means and said picture display means, and said liquid can convect.

2. A picture display apparatus as recited in claim 1, wherein said picture display means includes a cathode ray tube having a flat display face.

3. A picture display apparatus as recited in claim 1, wherein said picture display means comprises a liquid crystal panel, a light source, and light guiding means.

4. A picture display apparatus as recited in claim 1, wherein a light absorbing material is disposed between each adjacent one of said plurality of graded index lenses.

5. A picture display apparatus as recited in claim 1, wherein a parallel surface glass plate is provided between said electro-optical means and said image transfer means and wherein a liquid is disposed between said picture display device and said parallel surface glass plate.

6. A picture display apparatus as recited in claim 5, wherein said liquid can convect in spaces between said parallel surface glass plate and said image transfer means and between said image transfer means and said picture display means.

7. A picture display apparatus as recited in claim 1, wherein said plurality of graded index lenses are tubular.

8. A picture display apparatus as recited in claim 1, wherein the liquid has a temperature and a refractive index and wherein a mechanical distance between said image transfer means and said picture display means is automatically adjustable so that an optical distance between said image transfer means and said picture display means does not substantially vary even if the temperature of said liquid varies and the refractive index of said liquid varies.

9. A picture display apparatus as recited in claim 1, wherein the liquid has a temperature and a refractive index and wherein a mechanical distance between said image transfer means and said picture display means is automatically adjustable so that an optical distance between said image transfer means and said picture display means remains substantially equal to an optical distance between said electro-optical means and said image transfer means even if the temperature of said liquid varies and the refractive index of said liquid varies.

10. A picture display apparatus as recited in claim 1, wherein the picture displayed on said picture display means is transferred in equisize onto said photoconductive layer of said electro-optical means.

11. A picture display apparatus comprising:

picture display means for displaying a picture;

electro-optical means for converting an input optical image to a projected picture, said electro-optical means having a liquid crystal layer and a photoconductive layer; and an image transfer device disposed between said electro-optical means and said picture display means so that the picture displayed on said picture display means is transferred onto said photoconductive layer of said electro-optical means, said image transfer means having a plurality of graded index lenses parallel to an optical axis intersecting said electro-optical means and said picture display means, wherein a liquid is disposed between said image transfer means and said picture display means, the liquid having a temperature and a refractive index and wherein a mechanical distance between said image transfer means and said picture display means is automatically adjustable so that an optical distance between said image transfer means and said picture display means does not substantially vary even if the temperature of said liquid varies and the refractive index of said liquid varies.

12. A picture display apparatus comprising:

picture display means for displaying a picture;

electro-optical means for converting an input optical image to a projected picture, said electro-optical means having a liquid crystal layer and a photoconductive layer; and an image transfer device disposed between said electro-optical means and said picture display means so that the picture displayed on said picture display means is transferred onto said photoconductive layer of said electro-optical means, said image transfer means having a plurality of graded index lenses parallel to an optical axis intersecting said electro-optical means and said picture display means, wherein a liquid is disposed (a) between said electro-optical means and said image transfer means and (b) between said image transfer means and said picture display means, the liquid having a temperature and a refractive index and wherein a mechanical distance between said image transfer means and said picture display means is automatically adjustable so that an optical distance between said image transfer means and said picture display means remains substantially equal to an optical distance between said electro-optical means and said image transfer means even if the temperature of said liquid varies and the refractive index of said liquid varies.

13. A picture display apparatus comprising:

picture display means for displaying a picture;

electro-optical means for converting an input optical image to a projected picture, said electro-optical means having a liquid crystal layer and a photoconductive layer; and an image transfer device disposed between said electro-optical means and said picture display means so that the picture displayed on said picture display means is transferred onto said photoconductive layer of said electro-optical means, said image transfer means having a plurality of graded index lenses parallel to an optical axis intersecting said electro-optical means and said picture display means, wherein a parallel surface glass plate is provided between said electro-optical means and said image transfer means and a liquid is disposed between said picture display device and said parallel surface glass plate, said liquid can convect in spaces between said parallel surface glass plate and said image transfer means and between said image transfer means and said picture display means.

* * * * *